United States Patent
Han et al.

(10) Patent No.: US 7,150,220 B2
(45) Date of Patent: Dec. 19, 2006

(54) COOKING APPARATUS HAVING A CONTAMINATION PREVENTING UNIT

(75) Inventors: Dae-Sung Han, Hwasung (KR); Chul Kim, Yongin (KR); Yong-Woon Han, Kunpo (KR); Seong-Deog Jang, Suwon (KR); Kyung-Hee Hahm, Seoul (KR); Joo-Yeong Yeo, Hwasung (KR); Han-Seong Kang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 271 days.

(21) Appl. No.: 10/726,562

(22) Filed: Dec. 4, 2003

(65) Prior Publication Data
US 2004/0154476 A1    Aug. 12, 2004

(30) Foreign Application Priority Data
Feb. 6, 2003    (KR) ...................... 10-2003-0007566

(51) Int. Cl.
*A47J 37/06*    (2006.01)
(52) U.S. Cl. .............................. 99/400; 99/401; 99/446
(58) Field of Classification Search .................. 99/400, 99/401, 446, 447; 126/41 R, 39 R, 25 R
See application file for complete search history.

(56) References Cited

U.S. PATENT DOCUMENTS

| 3,154,004 | A |   | 10/1964 | Huck |
|---|---|---|---|---|
| 4,432,274 | A | * | 2/1984 | Kurotaki ...................... 99/400 |
| 4,441,015 | A |   | 4/1984 | Eichelberger et al. |
| 5,400,703 | A | * | 3/1995 | Ashcom et al. ................ 99/446 |
| 5,536,518 | A | * | 7/1996 | Rummel ...................... 426/523 |
| 5,718,165 | A | * | 2/1998 | Winstead ...................... 99/400 |
| 5,918,536 | A | * | 7/1999 | Cheng .......................... 99/447 |
| 6,104,004 | A |   | 8/2000 | Ragland et al. |
| 6,499,479 | B1 | * | 12/2002 | McLamb .................. 126/41 R |

FOREIGN PATENT DOCUMENTS

| DE | 2143006 | 9/1972 |
|---|---|---|
| JP | 2001-120440 | 5/2001 |

OTHER PUBLICATIONS

Communication including European Search Report from the European Patent Office dated Apr. 22, 2004 for the corresponding European patent application.

* cited by examiner

*Primary Examiner*—Reginald L. Alexander
(74) *Attorney, Agent, or Firm*—Staas & Halsey LLP

(57) ABSTRACT

A cooking apparatus which allows an interior of a cabinet thereof to be easily cleaned. The cooking apparatus includes a cabinet. The cabinet has an opening in a top surface defining a heating space. A heating unit to heat food is installed in the heating space and heat is transmitted from the heating unit to the food. A grill unit is seated on the top surface of the cabinet to support the food over the opening. A contamination preventing unit is installed in the heating space to prevent an inside surface of the cabinet from being contaminated with material dropping from the food. The cooking apparatus of the present invention guides splashed material back to a tray when the material collides with the tray splashes. The contamination preventing unit may be removed from the heating space, enabling a user to easily clean the contamination preventing unit.

22 Claims, 3 Drawing Sheets

COOKING APPARATUS HAVING A CONTAMINATION PREVENTING UNIT

CROSS-REFERENCE TO RELATED APPLICATIONS

This application claims the benefit of Korean Application No. 2003-7566, filed Feb. 6, 2003, in the Korean Intellectual Property Office, the disclosure of which is incorporated herein by reference.

BACKGROUND OF THE INVENTION

1. Field of the Invention

The present invention relates, in general, to cooking apparatuses and, more particularly, to a cooking apparatus which is capable of being easily cleaned.

2. Description of the Related Art

As is well known to those skilled in the art, cooking apparatuses are appliances which heat and cook food using heat generated by heating units.

Of these cooking apparatuses, there is a cooking apparatus which directly transmits heat to food, such as meat or sausage, thus cooking the food. The cooking apparatus includes a cabinet which defines an external appearance of the cooking apparatus. A heating unit is included in the cabinet to directly transmit heat to the food. A grill unit is mounted at a predetermined position above the heating unit to support the food in such a way as to be spaced apart from the heating unit.

Further, in the conventional cooking apparatus, the cabinet has an opening in the top surface and a heating space therein. The grill unit is seated in the opening in the top surface, so that heat is transmitted from the heating unit to the grill unit. A tray is included at a lower portion of the heating space to collect material, such as oil dropping from the food laid on the grill.

Thus, when heat is generated by the heating unit, the food laid on the grill unit is cooked by the heat which is transmitted from the heating unit through the heating space. The material produced from the food, such as oil, is collected in the tray, which is set at the lower portion of the heating space.

However, the conventional cooking apparatus has a problem that, when material produced from food, such as oil, drops from the grill unit to the tray and collides with the tray, a part of the material is splashed toward an inside surface of the cabinet. Thus, the interior of the cabinet may become dirty. When the interior of the cabinet becomes dirty by the material dropping from the grill unit as such, the cabinet, which has a small interior, is difficult to clean.

SUMMARY OF THE INVENTION

Accordingly, it is an aspect of the present invention to provide a cooking apparatus which is capable of being easily cleaned.

Additional and/or other aspects and advantages of the invention will be set forth in part in the description which follows and, in part, will be obvious from the description, or may be learned by practice of the invention.

The foregoing and/or other aspects of the present invention are achieved by providing a cooking apparatus including a cabinet, a grill unit, and a contamination preventing unit. The cabinet is opened at a top surface thereof to form an opening and has a heating space therein. A heating unit is included in the heating space and heat is transmitted from the heating unit to the food. The grill unit is seated on the top surface of the cabinet so as to support the food over the opening. The contamination preventing unit is included in the heating space to prevent an inside surface of the cabinet from being contaminated with material dropping from the food.

The contamination preventing unit is shaped like a plate, and is removably installed in the heating space through the opening.

The heating unit comprises two heating units installed at both sides of the heating space to face each other. Each of the two heating units is spaced apart from front and rear panels defining front and rear walls of the cabinet by a predetermined distance, thus preventing the heat from being transmitted from the heating units to the front and rear panels. A cover part integrally extends from each side edge of the contamination preventing unit to cover a space defined between the front and rear panels of the cabinet and the two heating units.

Further, a handle part extends from an upper edge of the contamination preventing unit. The handle part is bent at a predetermined angle, thus allowing the contamination preventing unit to be easily installed in and removed from the heating space.

A tray is included at a lower portion of the heating space to collect material, such as oil, dropping from the food. A lower edge of the contamination preventing unit is in contact with the tray to guide the oil, splashing toward the inside surface of the cabinet, to the tray.

Further, a tray is included at a lower portion of the heating space to collect material, such as oil, dropping from the food. The contamination preventing unit extends along an entire edge of the tray to be integrated with the tray into a single structure.

The heating unit comprises two heating units installed at both sides of the heating space to face each other. Two through holes are formed in the contamination preventing unit at positions corresponding to the two heating units. Thus, the thermal energy generated from the two heating units passes through the two through holes.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
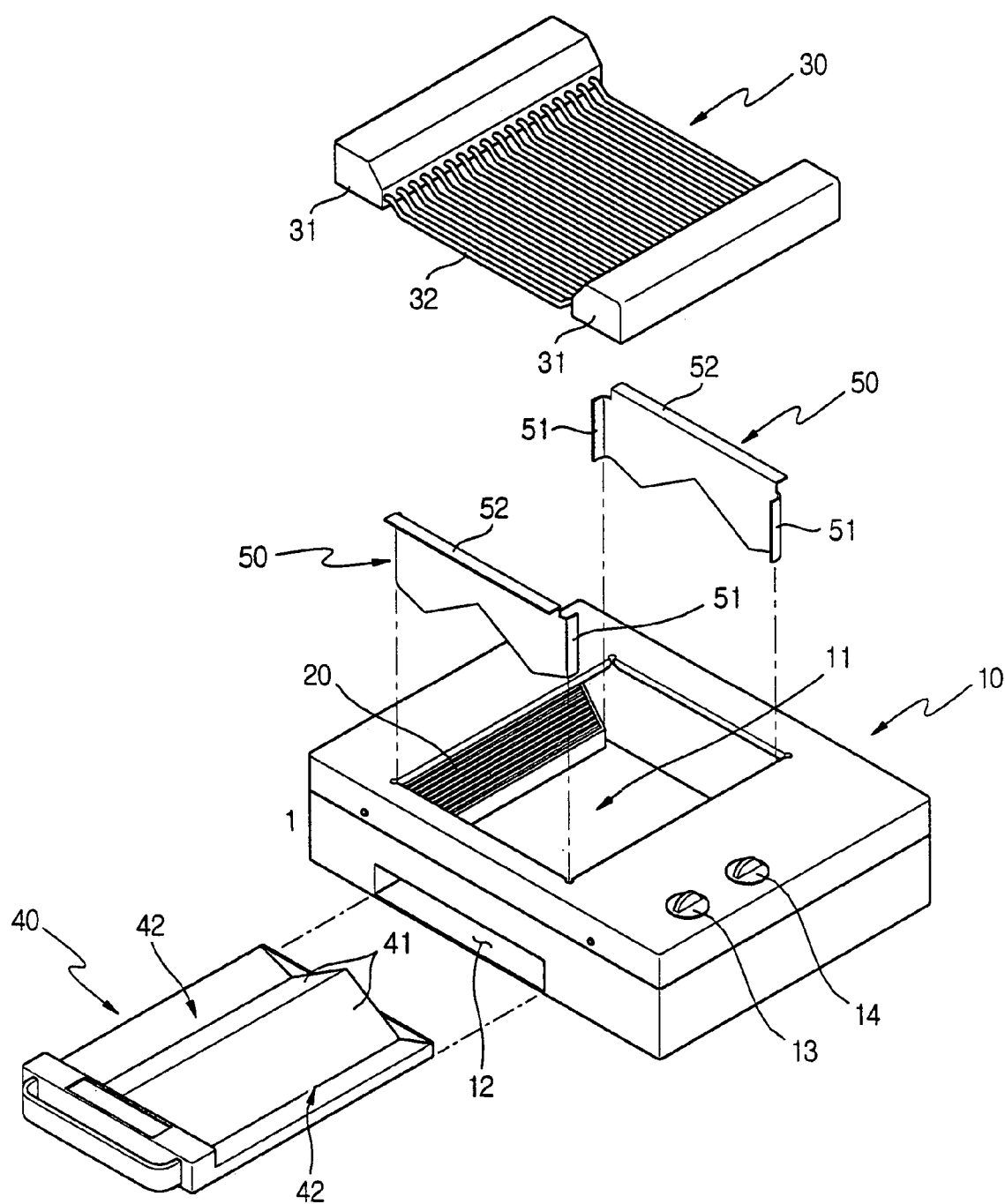
FIG. 1 is an exploded perspective view of a cooking apparatus, according to a first embodiment of the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

As illustrated in FIG. 1, a cooking apparatus 1 according to the present invention includes a box-shaped cabinet 10. A plurality of heating units 20 are installed in the cabinet 10 to transmit heat to food to be cooked. A grill unit 30 on which the food is laid is seated on a top surface of the cabinet 10. A tray 40 included in the cooking apparatus 1 collects materials, such as oil, dropping from the food laid on the grill unit 30 and guides thermal energy from the heating units 20 to the grill unit 30.

The cabinet 10 opens at the top surface thereof to form an opening. A heating space 11 is defined in the opening therein. The grill unit 30 is seated in the opening of the heating space 11. Thus, heat generated by the heating units 20 is transmitted to the grill unit 30.

The cabinet 10 also opens at a front surface allowing the tray 40 to be moved in and out of the cabinet 10 through the opening. When inserted into the cabinet 10, the tray 40 is received in a cavity 12 formed in the interior of the cabinet 10. A timer switch 13 to control operation time of the heating units 20 and a power switch 14 to control heating temperature are included at a surface of the cabinet 10.

The heating units 20 each comprise a ceramic member with a heating element to generate thermal energy, such as heat and far infrared rays. The heating units 20 are set in both sides of the cavity 12 such that front surfaces of the heating units 20 are opposite each other. Further, the heating units 20 are inclined to tilt toward the heating space 11 to transmit thermal energy to the grill unit 30, which is seated in the opening of the heating space 11.

The grill unit 30 includes two water tanks 31, and a plurality of grill pipes 32. The water tanks 31 are seated on both sides of the top surface of the cabinet 10, and contain water. The grill pipes 32 are arranged between the two water tanks 31 to connect the two water tanks 31 to each other, and have hollow structures that water flows through. The grill pipes 32 are continuously cooled by water supplied by the water tanks 31, thus preventing food in contact with the grill pipes 32 from being burnt.

The tray 40 is formed with a hump along a central axis. Reflecting plates 41 included at both sides of this hump reflect heat or far infrared rays from the heating units 20 to the grill unit 30. An oil collecting groove 42 is formed along a lowermost edge of each reflecting plate 41 to collect oil dropping from the food which is laid on the grill unit 30. Further, although not shown in the drawings, a predetermined amount of water is contained in the tray 40 so as to prevent an excessive rise in the temperature of the oil collecting grooves 42 and the reflecting plates 41. This prevents oil collected in the oil collecting grooves 42 from being burnt and adhering to the tray 40.

The cooking apparatus 1 according to the present invention further includes a contamination preventing unit 50. The contamination preventing unit 50 is removably installed in the heating space 11, thus preventing the inside surface of the cabinet 10 from being contaminated with a material, such as oil, dropping from the food and splashing inside the heating space. The contamination preventing unit 50 also guides this material back to the tray 40 after colliding with the tray 40 and splashing toward the inside of the cabinet.

Figure 2:
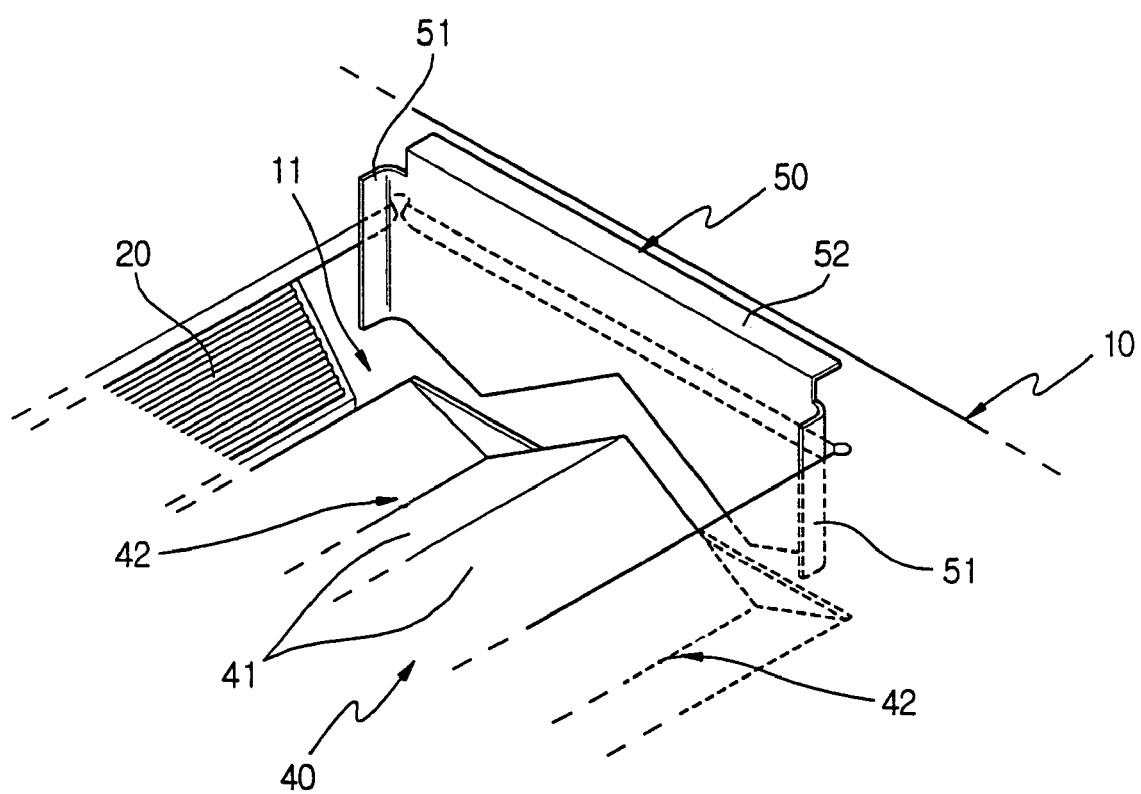
FIG. 2 is an enlarged view of a part of the cooking apparatus illustrated in FIG. 1.

According to a first embodiment of the present invention, as illustrated in FIG. 2, the contamination preventing unit 50 comprises two plate shaped contaminating preventing units. The two contamination preventing units 50 are inserted into the heating space 11 through the opening formed on the top surface of the cabinet 10 to cover front and rear portions of the heating space 11, respectively. Further, each contamination preventing unit 50 includes a lower edge is shaped like the reflecting plates 41 and the oil collecting grooves 42, so that the contamination preventing units 50 are in close contact with the tray 40.

Each heating unit 20 is spaced apart from front and rear panels defining front and rear walls of the cabinet 10 by a predetermined distance, thus preventing the heat from being transmitted from the heating units 20 to the front and rear panels. Thus, two cover parts 51 integrally extend from side edges of each contamination preventing unit 50 to cover the space defined between the front and rear panels of the cabinet 10 and the two heating units 20 and prevent material, such as oil, dropping from the food from entering a space defined between the front and rear panels of the cabinet 10 and on the two heating units.

Further, a handle part 52 extends from an upper edge of each contamination preventing unit 50 so as to be bent at a predetermined angle, thus allowing the contamination preventing unit 50 to be easily installed in and removed from the heating space 11. The handle part 52 is level with the top surface of the cabinet 10 so the handle part 52 of each contamination preventing unit 50 rests along an edge of the opening.

According to the first embodiment of the present invention, the contamination preventing units 50 are mounted at the front and rear portions of the heating space 11, respectively. However, the contamination preventing unit may be mounted at only one of the front and rear portions of the heating space 11.

Figure 3:
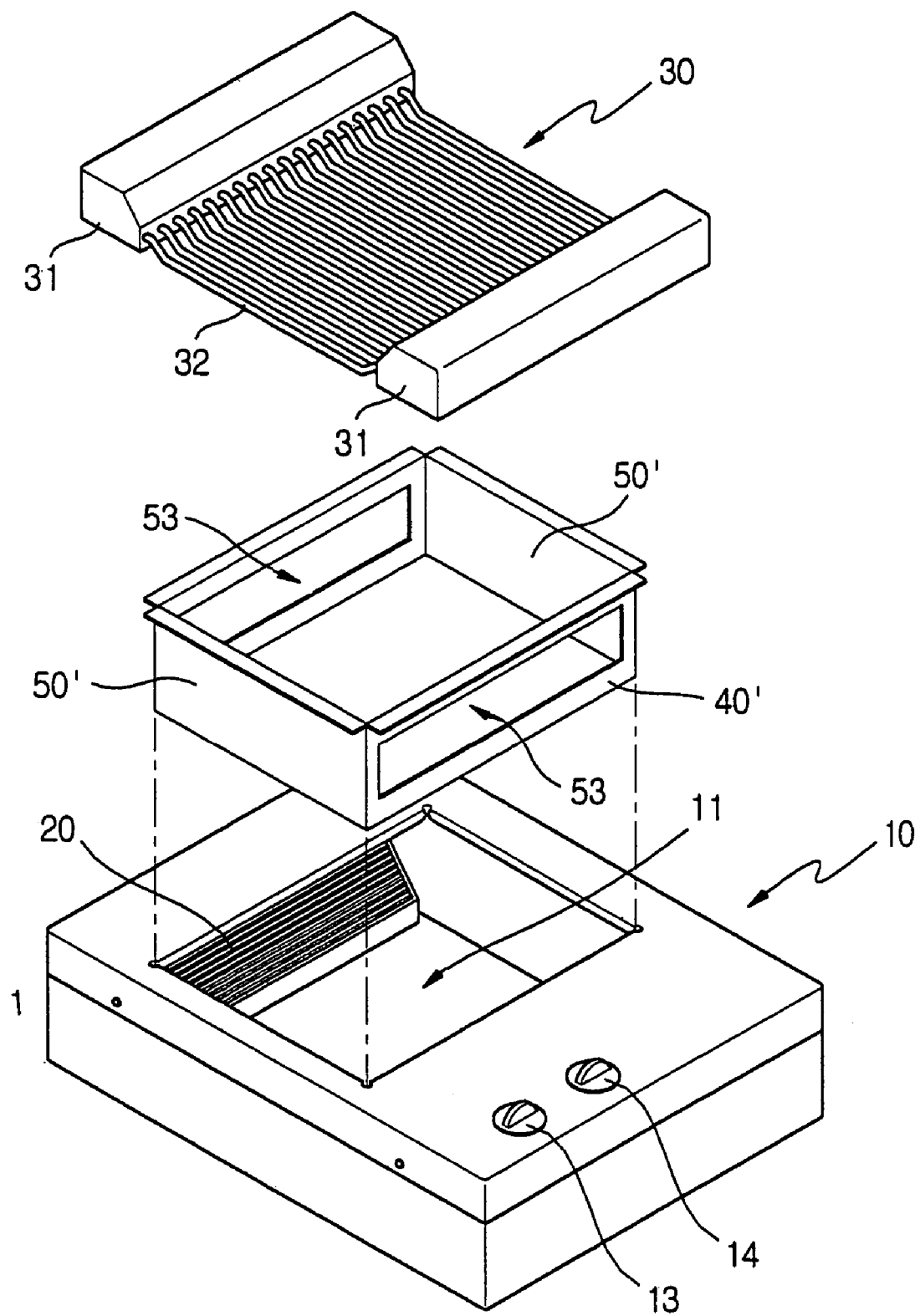
FIG. 3 is an exploded perspective view of a cooking apparatus, according to a second embodiment of the present invention.

Further, according to the first embodiment of the present invention, the contamination preventing units 50 are manufactured separately from the tray 40. However, as illustrated in FIG. 3, a contamination preventing unit 50' may extend along an entire edge of a tray 40' to be integrated with the tray 40' into a single structure. Further, two through holes 53 are formed in the contamination preventing unit 50' at positions corresponding to the two heating units 20, so that heat and far infrared rays generated from the two heating units 20 pass through the two through holes 53. Such a construction allows the tray 40' to be removed from the heating space 11 to be cleaned.

The operation and operational effect of the cooking apparatus 1 according to the present invention will be described in the following in detail with reference to the drawings.

First, after the tray 40 is placed in the cabinet 10 through the opening formed on the front surface of the cabinet 10, the contamination preventing units 50 are inserted into the heating space 11 through the opening formed on the top surface of the cabinet 10. Thus, the lower edges of the contamination preventing units 50 contact the tray 40.

Next, the grill unit 30 is seated in the opening which is formed on the top surface of the cabinet 10, and then food is laid on the grill pipes 32 of the grill unit 30. Thereafter, the heating units 20 radiate heat, thus heating and cooking the food.

While the food is cooked, material, such as oil, drips from the food drops to the tray 40, and collects in the oil collecting grooves 42. In this case, some oil dropping to the tray 40 splashes toward the inside surface of the cabinet 10 when the oil collides with the tray 40. But, since the front and rear portions of the heating space 11 are covered with the contamination preventing units 50, oil splashing toward the front and rear portions of the heating space 11 is guided to the tray 40 by the contamination preventing units 50. Further, the contamination preventing units 50 smeared with oil are taken out of the heating space 11 through the opening which is formed on the top surface of the cabinet 10, so the oil may be removed.

As apparent from the above description, the present invention provides a cooking apparatus 1, which is included with a contamination preventing unit which is removably installed in a heating space, thus guiding a material back to a tray when the material falls from the cooked food and collides with the tray and is splashed. The contamination preventing unit may be removed from the heating space, enabling a user to easily clean the contamination preventing unit.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cooking apparatus, comprising:
   a cabinet having an opening in a top surface defining a heating space;
   a heating unit installed in the opening, the heating space transmitting heat from the heating unit to food;
   a grill unit on the top surface of the cabinet supporting the food over the opening;
   a contamination preventing unit included in the heating space and preventing an inside surface of the cabinet from being contaminated with material dropping from the food;
   a tray in a lower portion of the heating space collecting the material dropping from the food; and
   a lower edge of the contamination preventing unit in contact with the tray to guide back to the tray.

2. The cooking apparatus according to claim 1, wherein the contamination preventing unit is shaped like a plate, and is removably installed in the heating space through the opening.

3. The cooking apparatus according to claim 2, wherein the heating unit comprises:
   two heating units, installed at both sides of the heating space to face each other, each being spaced apart from front and rear panels of the cabinet by a predetermined distance, which prevent the heat from being transmitted from the heating units to the front and rear panels, and
   a cover part extending from each side edge of the contamination preventing unit to cover a space between the front and rear panels of the cabinet and the two heating units.

4. The cooking apparatus according to claim 2, wherein a handle part extending from an upper edge of the contamination preventing unit is bent at a predetermined angle, allowing the contamination preventing unit to be easily installed in and removed from the heating space.

5. The cooking apparatus according to claim 1, further comprising a tray in a lower portion of the heating space collecting the material dropping from the food, the tray being integrally connected to the contamination preventing unit.

6. The cooking apparatus according to claim 5, wherein the heating unit comprises two heating units installed at both sides of the heating space to face each other, and
   two through holes that allow thermal energy generated from the two heating units to pass through the through holes.

7. The cooking apparatus according to claim 4, wherein the plate further comprises a handle extending substantially outside the cabinet.

8. The cooking apparatus according to claim 1, wherein the contamination preventing unit further comprises:
   a removable tray installed through the opening; and
   a plate integrally connected to the tray installed through the opening, wherein the tray collects material dropping from the food during cooking and the plate deflects uncollected material from the food to the tray.

9. The cooking apparatus according to claim 8, wherein the tray comprises an incline directing material dropping from the food and material from the food deflected by the plate into a groove.

10. The cooking apparatus according to claim 9, wherein an edge of the plate extends to a surface of the tray.

11. The cooking apparatus according to claim 10, wherein the plate further comprises a handle extending substantially outside the cabinet.

12. A cooking apparatus, comprising:
    a hollow cabinet defining a heating space and having a first opening in a top surface in which food is supported and a second opening in a side surface;
    a heating unit providing heat which is transmitted to the food through the hollow cabinet;
    a contamination preventing unit which collects material dropping from the food during cooking and collects material from the food which is deflected inside the cabinet away from a center of the contamination preventing unit;
    a tray in a lower portion of the heating space collecting the material dropping from the food; and
    a lower edge of the contamination preventing unit in contact with the tray to guide back to the tray.

13. A cooking apparatus, comprising:
    a hollow cabinet having a first opening in a top surface in which food is supported and a second opening in a side surface;
    a heating unit providing heat which is transmitted to the food through the hollow cabinet; and
    a contamination preventing unit which collects material dropping from the food during cooking and collects material from the food which is deflected inside the cabinet,
    wherein the contamination preventing unit further comprises:
    a removable tray installed through the second opening; and
    a removable plate installed through the first opening, wherein the tray collects material, which is deflected by the plate, and material dropping from the food during cooking, and the plate deflects uncollected material from the food to the tray.

14. The cooking apparatus according to claim 13, wherein the tray comprises:
    a groove in the tray to collect material from the food; and
    a plurality of inclines directing material expelled from the food and material deflected by the plate into the groove.

15. The cooking apparatus according to claim 14, wherein an edge of the plate extends to a surface of the tray.

16. The cooking apparatus according to claim 15, wherein the plate further comprises a handle extending substantially outside of the cabinet.

17. The cooking apparatus according to claim 13, wherein the tray comprises:
    an elevated section running through a center line of the tray;
    a groove on a side of the elevated section, running along a length of the elevated section, to collect material from the food; and
    an inclined section running from the elevated section to the groove.

18. The cooking apparatus according to claim 17, wherein an edge of the plate extends to the surface of the tray.

19. A cooking apparatus, comprising:
a hollow cabinet having an opening in a top surface in which food is supported;
a heating unit defining a heating space and providing heat which is transmitted to the food through the hollow cabinet; and
a contamination preventing unit which collects material expelled from the food during cooking, and collects material from the food, which is deflected inside the cabinet;
a tray in a lower portion of the heating space collecting the material dropping from the food; and
a lower edge of the contamination preventing unit in contact with the tray to guide back to the tray.

20. A cooking apparatus, comprising:
a cabinet having an opening in a top surface defining a heating space;
a heating unit installed in the opening, the heating space transmitting heat from the heating unit to food;
a grill unit on the top surface of the cabinet supporting the food over the opening; and
a contamination preventing unit included in the heating space and preventing an inside surface of the cabinet from being contaminated with material dropping from the food, wherein the contamination preventing unit comprises:
a removable tray installed through the opening; and
a plate integrally connected to the tray installed through the opening,
wherein the tray collects material dropping from the food during cooking and the plate deflects uncollected material from the food to the tray;
wherein the tray comprises:
an elevated section running through a center line of the tray;
a groove on a side of the elevated section, running along a length of the elevated section, to collect material from the food; and
an inclined section running from the elevated section to the groove.

21. The cooking apparatus according to claim 20, wherein an edge of the plate extends to a surface of the tray.

22. The cooking apparatus according to claim 21, wherein the plate further comprises a handle extending substantially outside the cabinet.

* * * * *